United States Patent Office 3,574,201
Patented Apr. 6, 1971

3,574,201
5-NITROFURYL-1,2,4-OXADIAZINE DERIVATIVES
Hermann Breuer, Regensburg, Germany, assignor to E. R. Squibb & Sons, Inc., New York, N.Y.
No Drawing. Filed July 30, 1969, Ser. No. 846,221
Claims priority, application Germany, Sept. 27, 1968, P 17 95 410.8
Int. Cl. C07d 87/52
U.S. Cl. 260—240
10 Claims

ABSTRACT OF THE DISCLOSURE 5-nitrofuryl-1,2,4-oxadiazines of the formula

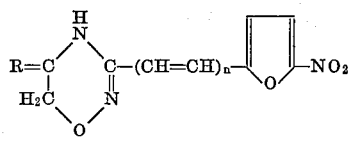

wherein R is oxygen, an imino group or a lower alkanoylimino group and n is zero or one, are useful as antimicrobial agents. A 3-(5-nitro-2-furyl)-5-halomethyl - 1,2,4-oxadiazole, upon treatment with aqueous alkali in a solvent or with liquid amomnia, yields, respectively, a compound of the above formula wherein R is oxygen or imino. The imino group may then be acylated.

DETAILED DESCRIPTION

This invention relates to new 5-nitrofuryl-1,2,4-oxadiazine derivatives of the formula (I)

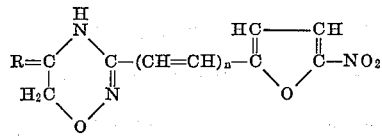

wherein R is oxygen (O=), imino (HN=) or lower alkanoylimino, and n is 0 or 1. The lower alkanoylimino groups include acylimino groups wherein the acyl group is obtained from a lower fatty acid containing 1 to 7 carbons in the acyl group, e.g., form imino, acetylimino, propionylimino, isopropionylimino, butyrylimino, and the like.

The new compounds of Formula I may be produced from 5-nitro-2-furyl-1,2,4-oxadiazoles of the formula (II)

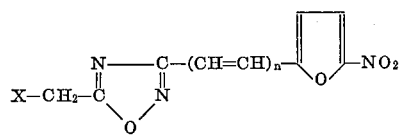

wherein X is a halogen, preferably chlorine or bromine, and n is 0 or 1.

By treating a compound of Formula II with aqueous alkali, e.g., alkali metal hydroxide like sodium hydroxide, a nitrofuryl-1,2,4-oxadiazine of the formula (III)

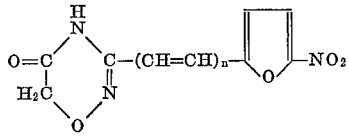

is obtained.

By treating a compound of Formula II with ammonia or as a solution in an organic solvent, a nitrofuryl-1,2,4-oxadiazine of the formula (IV)

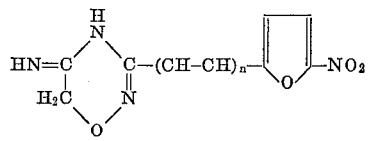

is obtained.

Acylation of a compound of Formula IV, e.g., with an acylating agent such as anhydrous formic acid or an acid anhydride like acetic anhydride, butyric acid anhydride, or the like, converts the imino group to a lower alkanolyimino group.

The new compounds of Formula I are useful as antimicrobial agents and may be used to combat infections in animal species due to organisms such as Trichomonas vaginalis, Trichomonas foetus, Staphylococcus aureus, Salmonella schottmuelleri, Klebsiella pneumoniae, Proteus vulgaris, Escherichia coli or Trichophyton mentagrophytes. For example, a compound or mixture of compounds of Formula I may be administered orally to an infected animal, e.g., a mouse in an amount of about 5 to 25 mg. per kg. per day in 2 to 4 divided doses, conventionally formulated in a tablet, capsule or elixir, or applied topically, e.g., to dermatophytosis in a guinea pig, in a lotion, salve or cream at a concentration of about 0.1 to 3 percent by weight.

They may also be used as surface distinfectants at a concentration of about 0.01 to 1 percent by weight in an inert solid or liquid carrier. They may be incorporated for example, in a soap or other cleansing agent, e.g., a solid or liquid detergent, for cleaning dairy barns or equipment or food processing equipment.

The following examples are illustrative. Temperatures are expressed on the centigrade scale.

EXAMPLE 1

A mixture of 80 ml. of acetic anhydride and 34 g. of nitric acid (d.=1.52) is formed at 0°. 28 g. of 3-[β-(2-furyl)vinyl]-5-chloromethyl-1,2,4 - oxadiazole [prepared by O-acylation of 2-furanacrylamidoxime with chloracetyl chloride in dry dioxane in the presence of pyridine and then heating in toluene; 2-furanacrylamidoxime (M.P. 68–70°) is prepared by treating 2-furanacrylonitrile with an alcoholic solution of hydroxylamine at 40°, evaporating the solvent and treating the residue with water] are introduced portionwise with stirring at —20°. The substance initially goes quickly into solution. When the last of the oxadiazole is added, a thick crystalline slurry forms. This is stirred for 15 minutes more, filtered under suction and washed with a little cold acetic anhydride. The 3-[β-(5-nitro-2-furyl)vinyl]-5-chloromethyl-1,2,4 - oxadiazole is crystallized from acetone, M.P. 128—130.

19 g. of 3 - [β - (5 - nitro - 2 - furyl)vinyl] - 5 - chloromethyl-1,2,4-oxadiazole are added to 450 ml. of liquid ammonia at 45°. The substance goes gradually into solution. After stirring at —40° for two hours, an almost clear, dark green solution results. The cooling is now discontinued. After evaporation of the ammonia, the residue is treated with water, filtered under suction and dried. 13 g. of 3 - [β - (5 - nitro - 2 - furyl)vinyl] - 5 - imino-1,2,4-oxadiazine, dec. 190–191°, are obtained. Recrystallization of a sample from pyridine does not result in a change in decomposition point.

EXAMPLE 2

1 g. of the product of Example 1 is dissolved in 20 ml. of acetic anhydride and 1 ml. of pyridine while warming slightly. The solution is treated with charcoal and filtered. After cooling, the precipitated crystals are filtered under suction. There are obtained 0.5 g. of 3 - [β - (5 - nitro-2 - furyl)vinyl] - 5 - acetimino - 1,2,4 - oxadiazine, M.P. 171–173°.

EXAMPLE 3

A saturated solution of 2.3 g. (0.01 mol.) of 3-(5-nitro - 2 - furyl) - 5 - chloromethyl - 1,2,4 - oxadiazole in tetrahydrofuran is added dropwise to approximately 50 ml. of liquid ammonia. After the addition is completed, the cooling bath is removed and the ammonia is permitted to evaporate. The residue is treated with water and the crystals are filtered under suction. There are obtained 1.8 g. of 3 - (5 - nitro - 2 - furyl) - 5 - imino-1,2,4-oxadiazine, M.P. 198° with dec. After recrystallization from dioxane, the substance decomposes at 212°.

EXAMPLE 4

5 g. of 3 - (5 - nitro - 2 - furyl) - 5 - imino - 1,2,4-oxadiazine are brought into solution in 25 ml. of acetic anhydride with warming. The warm solution is filtered, cooled and the crystals filtered under suction. 4.5 g. of 3 - (5 - nitro - 2 - furyl) - 5 - acetylimino - 1,2,4 - oxadiazine, M.P. 185° with dec., are obtained.

EXAMPLE 5

2.3 g. (0.01 mol.) of 3 - (5 - nitro - 2 - furyl) - 5 - monochloromethyl - 1,2,4 - oxadiazole are dissolved in 20 ml. of 75% dimethylformamide. At a temperature of about 10 to 15°, 12.5 ml. of 2 N sodium hydroxide solution are added dropwise over a period of 5 minutes. As soon as the addition is completed, the mixture is immediately acidified with 2 N hydrochloric acid. The crystals are then filtered under suction. The yield is 1.3 g. of 3 - (5 - nitro - 2 - furyl) - 1,2,4 - oxadiazin - 5 - one, dec. pt. 209–210°. The product is recrystallized from acetone-water, M.P. 220–223° with dec.

By dissolving the equivalent amount of 3 - (5 - nitro-2 - furyl) - 5 - monobromomethyl - 1,2,4 - oxadiazole in dimethylformamide instead of the chloromethyl compound in the foregoing procedure, the same product is obtained.

EXAMPLE 6

10 g. 3 - [β - (5 - nitro - 2 - furyl)vinyl] - 5 - chloromethyl - 1,2,4 - oxadiazole are dissolved in 150 ml. of 75% dimethylformamide with slight warming. Upon cooling to room temperature, a portion of the product crystallizes. Without further cooling, 50 ml. of 2 N sodium hydroxide solution are added all at once. The temperature thereupon rises to 35°. As soon as a clear solution results (after several minutes), the solution is acidified with 2 N hydrochloric acid.

8.7 g. of 3 - [β - (5 - nitro - 2 - furyl)vinyl] - 1,2,4-oxadiazin - 5 - one are obtained in the form of yellow-green crystals. Upon recrystallization from dioxane, the compound has a decomposition point of 242°.

EXAMPLE 7

7 g. of 3 - (5 - nitro - 2 - furyl) - 5 - imino - 1,2,4-oxadiazine is dissolved with warming in 5 ml. of anhydrous formic acid, then the solution is allowed to cool to room temperature. The precipitated crystals are filtered under suction to obtain 0.7 g. of 3 - (5 - nitro - 2 - furyl) - 5 - formimino - 1,2,4 - oxadiazine, M.P. 161–162°, with dec.

EXAMPLE 8

1 g. of 3 - (5 - nitro - 2 - furyl) - 5 - imino - 1,2,4-oxadiazine is dissolved in 5 ml. of butyric acid anhydride with warming. Upon cooling, the crystals are filtered under suction. There are obtained 0.9 g. of 3 - (5 - nitro - 2 - furyl) - 5 - butyrylimino - 1,2,4 - oxadiazine, M.P. 154–155°, with slight dec.

What is claimed is:
1. A compound of the formula

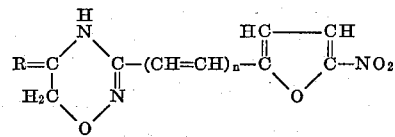

wherein R is oxygen, imino or lower alkanoylimino and $n$ is 0 or 1.

2. A compound as in claim 1 wherein R is lower alkanoylimino and $n$ is 0.

3. A compound as in claim 1 wherein R is lower alkanoylimino and $n$ is 1.

4. A compound as in claim 1 wherein R is oxygen and $n$ is 0.

5. A compound as in claim 1 wherein R is oxygen and $n$ is 1.

6. A compound as in claim 1 wherein R is imino and $n$ is 0.

7. A compound as in claim 1 wherein R is imino and $n$ is 1.

8. A compound as in claim 1 wherein R is acetylimino and $n$ is 1.

9. A compound as in claim 1 wherein R is acetylimino and $n$ is 0.

10. A compound as in claim 1 wherein R is formimino and $n$ is 0.

References Cited

UNITED STATES PATENTS 3,474,462  10/1969  Breuer _____ 260—240

JOHN D. RANDOLPH, Primary Examiner

U.S. Cl. X.R.

424—248; 260—244